(12) United States Patent
Bakatsias et al.

(10) Patent No.: US 9,166,312 B2
(45) Date of Patent: Oct. 20, 2015

(54) TERMINAL BLOCK ASSEMBLIES AND PRINTED CIRCUIT BOARD ASSEMBLIES INCLUDING SAME

(71) Applicant: Raycap, S.A., Athens (GR)

(72) Inventors: Kostas Bakatsias, Athens (GR); Jonathan Martinez, Spokane Valley, WA (US); Zafiris G. Politis, Athens (GR)

(73) Assignee: Raycap, S.A., Athens (GR)

( * ) Notice: Subject to any disclaimer, the term of this patent is extended or adjusted under 35 U.S.C. 154(b) by 30 days.

(21) Appl. No.: 14/220,982

(22) Filed: Mar. 20, 2014

(65) Prior Publication Data

US 2015/0263442 A1   Sep. 17, 2015

(30) Foreign Application Priority Data

Mar. 14, 2014   (GR) .................................. 140100140

(51) Int. Cl.
*H01R 12/58* (2011.01)
*H01R 12/70* (2011.01)
*H01R 12/75* (2011.01)

(52) U.S. Cl.
CPC ............ *H01R 12/7082* (2013.01); *H01R 12/75* (2013.01)

(58) Field of Classification Search
CPC .............................. H01R 12/58; H01R 11/281
See application file for complete search history.

(56) References Cited

U.S. PATENT DOCUMENTS

| | | | |
|---|---|---|---|
| 3,287,517 A | 11/1966 | Campbell | |
| 4,345,806 A * | 8/1982 | McHenney | H01R 4/30 439/510 |
| 4,432,594 A * | 2/1984 | Daggett | H01H 85/205 439/698 |
| 4,533,200 A | 8/1985 | Wilson | |
| 4,889,500 A * | 12/1989 | Lazar | H01R 23/688 439/364 |
| 5,207,587 A * | 5/1993 | Hamill | B60R 16/0238 361/826 |
| 5,215,480 A * | 6/1993 | Lesslie | H01H 71/08 361/730 |
| 6,015,302 A | 1/2000 | Butts et al. | |
| 6,036,554 A * | 3/2000 | Koeda | H01R 4/305 439/796 |
| 6,038,119 A | 3/2000 | Atkins et al. | |
| 6,142,815 A * | 11/2000 | Whiteman, Jr. | H01R 9/24 439/381 |
| 6,234,817 B1 | 5/2001 | Hwang | |
| 6,354,889 B1 | 3/2002 | Matsuda et al. | |

(Continued)

FOREIGN PATENT DOCUMENTS

WO   WO 2008 152 069 A1   12/2008

OTHER PUBLICATIONS

"Photography of Two Conductor Terminal Lug", Jan. 1, 2008 or earlier (1 page).

(Continued)

*Primary Examiner* — Truc Nguyen
(74) *Attorney, Agent, or Firm* — Myers Bigel Sibley & Sajovec, PA

(57) ABSTRACT

A printed circuit board (PCB) assembly for use with first and second cables terminated with first and second cable lugs, respectively, wherein each of the first and second cable lugs includes two lug holes defined therein, the includes a PCB and a terminal block. The terminal block includes an electrically insulating base mounted on the PCB, and at least one electrically conductive conductor member mounted on the base and electrically connected to the PCB. The at least one conductor member is configured to engage each of the first and second cable lugs through the four lug holes thereof to electrically in-line terminate the first and second cables at the terminal block.

22 Claims, 14 Drawing Sheets

(56) References Cited

U.S. PATENT DOCUMENTS

| | | | |
|---|---|---|---|
| 6,361,375 B1 | 3/2002 | Sinclair | |
| 6,405,139 B1 * | 6/2002 | Kicinski | H02K 11/0078 439/208 |
| 6,430,020 B1 | 8/2002 | Atkins et al. | |
| 6,540,562 B1 | 4/2003 | Baker et al. | |
| 6,556,402 B2 | 4/2003 | Kizis et al. | |
| 6,570,088 B1 * | 5/2003 | Depp | B60R 16/0238 174/50 |
| 6,679,708 B1 * | 1/2004 | Depp | H01R 9/2466 361/752 |
| 7,275,967 B1 * | 10/2007 | Olliff | H01R 31/02 439/654 |
| 7,433,169 B2 | 10/2008 | Kamel et al. | |
| 7,628,659 B2 * | 12/2009 | Thompson | H01R 13/70 174/113 R |
| 7,918,692 B1 * | 4/2011 | Hertzler | H01R 9/2408 439/712 |
| 7,980,902 B2 * | 7/2011 | Capaldi-Tallon | H01R 9/2608 439/532 |
| 8,057,268 B2 | 11/2011 | Seng et al. | |
| 8,376,758 B2 * | 2/2013 | Sell | B60D 1/64 439/34 |
| 8,647,159 B2 * | 2/2014 | Steeves | H01R 4/305 439/798 |
| 2008/0310095 A1 | 12/2008 | Chiang et al. | |
| 2008/0311800 A1 * | 12/2008 | Tsai Wu | 439/709 |
| 2012/0021635 A1 | 1/2012 | Tiegs et al. | |
| 2012/0081827 A1 | 4/2012 | Gillespie et al. | |
| 2013/0335869 A1 | 12/2013 | Xepapas et al. | |

OTHER PUBLICATIONS

International Hydraulics, Inc., "IHI Connectors", CAD Layout Drawing, Dec. 1, 2008 (1 page).

Burndy Products Compression, "Two Hole Hylug Code Conductor Standard Barrel", Jan. 1, 2013 or earlier (7 pages).

Indus Bakelite Industries, "Motor Terminal", 2013, Indus Bakelite Industries, http://www.indiamart.com/indus-bakelite/terminal-blocks.html, 3 pages.

Indus Bakelite Industries, "Terminal Plates", 2013, Indus Bakelite Industries, http://www.indiamart.com/indus-bakelite/terminal-plates.html, 3 pages.

Raycap, "The Strikesorb surge protection module: A new era", 2012, Raycap, http://www.raycapsurgeprotection.com/wp-content/uploads/2011/07/Strikesorb_Whitepaper-English_2013.pdf, 8 pages.

* cited by examiner

TERMINAL BLOCK ASSEMBLIES AND PRINTED CIRCUIT BOARD ASSEMBLIES INCLUDING SAME

CROSS-REFERENCE TO RELATED APPLICATIONS

This U.S. non-provisional patent application claims the benefit of priority under 35 U.S.C. §119 of Greek Patent Application 20140100140, filed Mar. 14, 2014, the disclosure of which is hereby incorporated herein by reference in its entirety.

FIELD OF THE INVENTION

The present invention relates to electrical connections and, more particularly, to terminal blocks for printed circuit boards.

BACKGROUND OF THE INVENTION

In a split Radio Base Station (RBS) architecture, the typical RBS consists of a Base Band Unit (BBU) and Remote Radio Heads (RRH) connected by cabling. DC power to the RRH is provided through copper cables traveling from the base station to the top of the tower or roof top. This creates a conductive path, making the active equipment at the top and the base of the site vulnerable to damage by direct lightning strikes. Lightning surge protection systems installed in front of both the BBU and the RRH must be able to withstand repeated direct lightning currents in order to protect the sensitive equipment both on the tower and in the shelter. Surge protection systems are provided to protect critical network assets from direct lightning currents, offer remote radio head surge protection and help cellular carriers maintain continuous uptime while lowering their operational expenditures. In particular, surge protection solutions may be provided to protect mobile networks using Remote Radio Head (RRH) architectures against damage from lightning strikes and provide cable management solutions for the network.

SUMMARY OF THE INVENTION

According to embodiments of the present invention, a printed circuit board (PCB) assembly for use with first and second cables terminated with first and second cable lugs, respectively, wherein each of the first and second cable lugs includes two lug holes defined therein, includes a PCB and a terminal block. The terminal block includes an electrically insulating base mounted on the PCB, and at least one electrically conductive conductor member mounted on the base and electrically connected to the PCB. The at least one conductor member is configured to engage each of the first and second cable lugs through the four lug holes thereof to electrically in-line terminate the first and second cables at the terminal block.

In some embodiments, the at least one conductor member is an integral conductor member configured to directly electrically contact each of the first and second cable lugs through the four lug holes thereof to electrically in-line terminate the first and second cables at the terminal block.

In some embodiments, the integral conductor member forms a Kelvin connection between the first and second cables and a device that is electrically connected via the PCB.

According to some embodiments, the at least one conductor member includes an electrically conductive conductor member body and four connecting posts projecting from the conductor member body, and the four connector posts are arranged and configured to extend through the four lug holes of the first and second cable lugs to secure the first and second cable lugs to the conductor member body. In some embodiments, the connector posts are each threaded posts, and the PCB assembly further includes four nuts installable on the threaded posts to clamp the first and second cable lugs onto the conductor member body. In some embodiments, the four posts each form a part of a respective bolt extending through the base and the conductor member body, and the base includes anti-rotation features to restrain the rotation of the bolts when the nuts are installed on the bolts.

According to some embodiments, the base defines an upper cavity on a side of the at least one conductor member opposite the PCB, and the terminal block is configured to receive and secure the first and second cable lugs in the upper cavity.

According to some embodiments, the base defines a lower cavity between the at least one conductor member and the PCB, and the terminal block is configured to receive and secure the first and second cable lugs on a side of the conductor member opposite the lower cavity.

In some embodiments, the terminal block includes at least one integral electrical contact pin extending into the PCB and electrically connecting the at least one conductor member to an electrically conductive trace pattern of the PCB. The at least one contact pin may be soldered to the PCB.

The PCB assembly may include a bolt securing the terminal block to the PCB. In some embodiments, the bolt electrically connects the at least one conductor member to an electrically conductive trace pattern of the PCB.

According to some embodiments, at least one of the at least one conductor member and the base includes an integral coupling feature interlocking the at least one conductor member and the base together.

The base may include a coupling feature that is received in the PCB to secure the terminal block to the PCB.

The PCB assembly may include a second electrically insulating base mounted on the PCB, wherein the first base is mounted on top of and is secured to the PCB by the second base.

The PCB assembly may include a plurality of the terminal blocks mounted on the PCB to form a terminal block array. In some embodiments, at least one of the terminal blocks of the terminal block array includes an integral coupling feature securing said terminal block to an adjacent terminal block of the terminal block array. According to some embodiments, the PCB assembly includes: a first one of the terminal blocks of the terminal block array configured to secure a first pair of the cable lugs at a first height above the PCB; and a second one of the terminal blocks of the terminal block array configured to secure a second pair of the cable lugs at a second height above the PCB, wherein the second height is greater than the first height to provide a multi-level connection configuration.

The PCB assembly may include a surge protection device (SPD) module mounted on the PCB, wherein the PCB includes an electrically conductive trace electrically connecting the terminal block to a terminal of the SPD module.

According to method embodiments of the present invention, a method for connecting first and second cables to a printed circuit board (PCB) assembly, wherein the first and second cables are terminated with first and second cable lugs, respectively, and each of the first and second cable lugs includes two lug holes defined therein, includes providing a PCB assembly including a PCB and a terminal block. The terminal block includes an electrically insulating base mounted on the PCB, and at least one electrically conductive conductor member mounted on the base and electrically connected to the PCB. The method further includes engaging each of the first and second cable lugs with the at least one conductor member through the four lug holes thereof to electrically in-line terminate the first and second cables at the terminal block.

According to further embodiments of the present invention, a terminal block for connecting first and second cables to a substrate, wherein first and second cables are terminated with first and second cable lugs, respectively, and each of the first and second cable lugs includes two lug holes defined therein, includes an electrically insulating base configured to be mounted on the substrate, and at least one electrically conductive conductor member mounted on the base. The at least one conductor member is configured to engage each of the first and second cable lugs through the four lug holes thereof to electrically in-line terminate the first and second cables at the terminal block.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
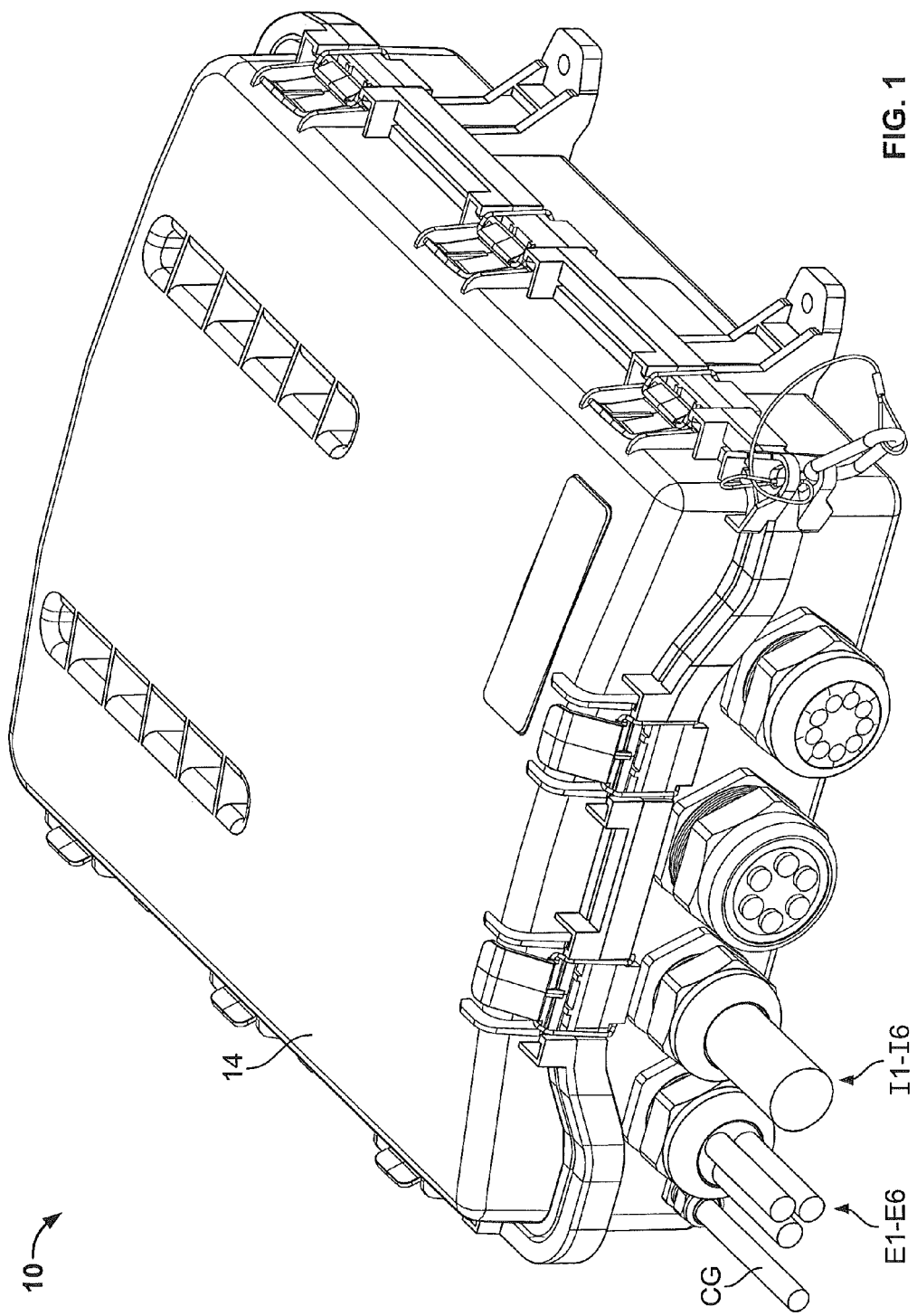
FIG. 1 is a top front, perspective view of a surge protection system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

With reference to FIGS. 1-11, a surge protection system 10 according to embodiments of the present invention is shown therein. The system 10 includes an enclosure 14 containing a printed circuit board (PCB) assembly 30. As discussed in more detail below, the PCB assembly 30 includes a PCB 40, a plurality of connectors or electrical terminal blocks 101-106 according to embodiments of the invention mounted on the PCB 40, and a plurality of surge protection device (SPD) modules 50 also mounted on the PCB 40. The terminal blocks 101-106 are used to mechanically and electrically couple input cables I1-I6 and output cables E1-E6 to the PCB 40 via respective two-hole cable lugs 20. An electrical ground cable CG is also mechanically and electrically coupled to the PCB 40 by a ground terminal connector 48. The terminal blocks 101-106 collectively form a terminal block array 80 having two stepped or multi-level rows 80A and three columns 80B.

The enclosure 14 can be of any suitable construction for environmentally protecting the PCB assembly 30. Ports are provided for entry of the cables I1-I6, E1-E6, CG. An openable or removable lid can be provided to access the terminal blocks 101-106.

Figure 3:
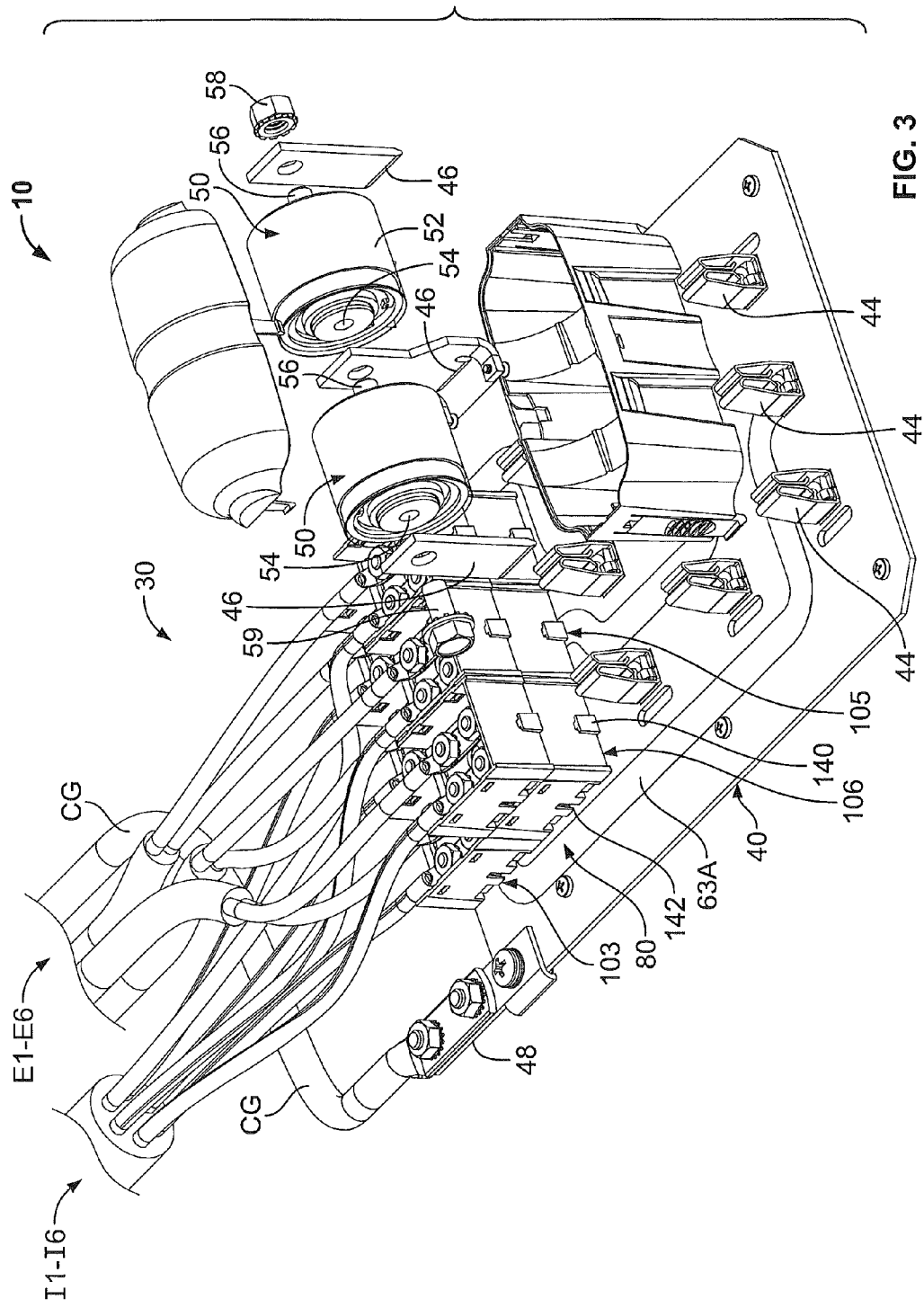
FIG. 3 is a fragmentary, exploded, top, rear perspective view of a PCB assembly forming a part of the surge protection system of FIG. 1.
Figure 4:
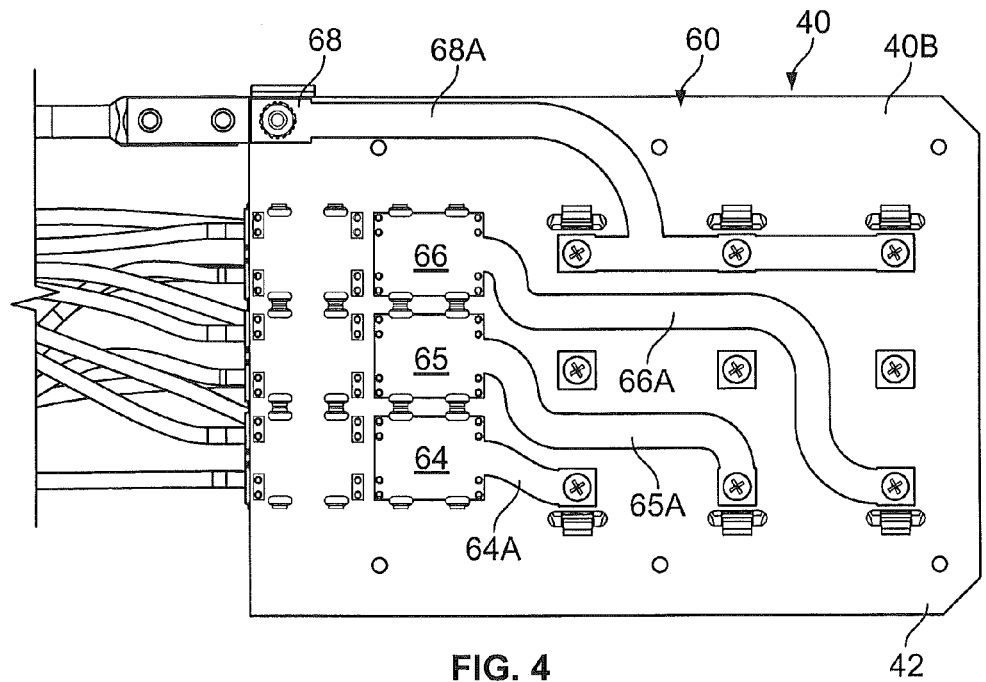
FIG. 4 is a bottom plan view of the PCB assembly of FIG. 3.
Figure 5:
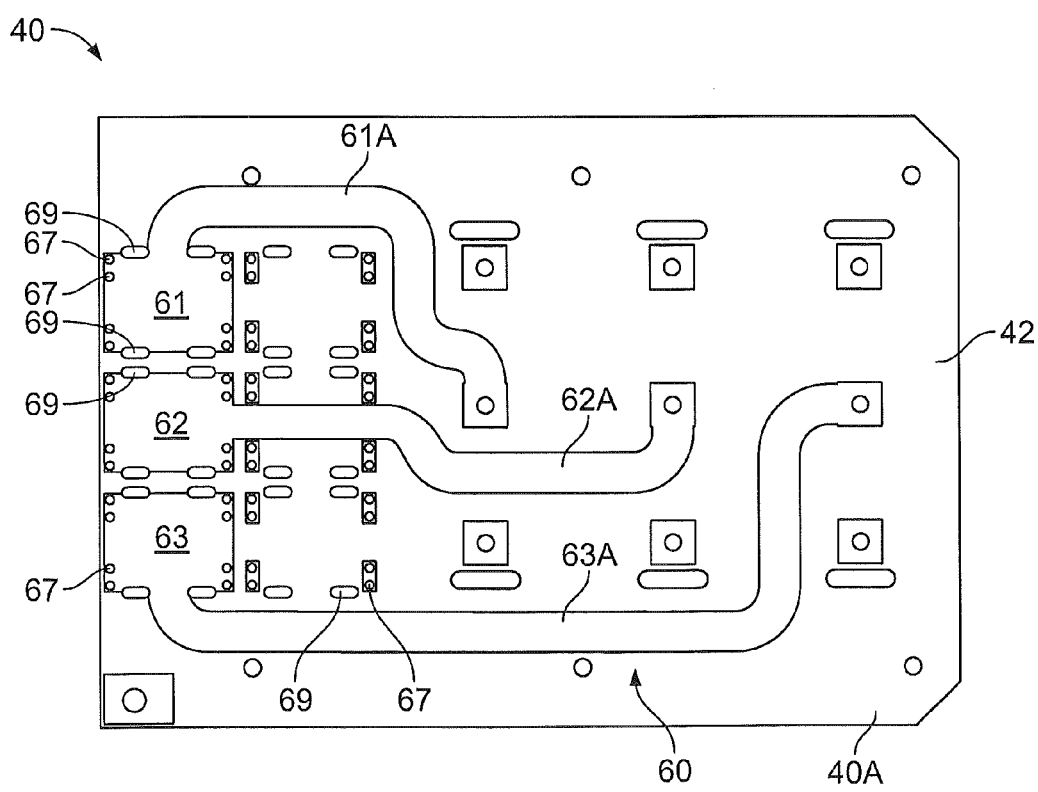
FIG. 5 is a top plan view of a PCB forming a part of the PCB assembly of FIG. 3.

With reference to FIGS. 3-5, the PCB 40 includes a substrate 42 and an electrically conductive trace pattern 60 (e.g., copper) on opposed top and bottom sides 40A and 40B of the substrate 42. Mount holes 69 and through holes 67 are defined through the substrate 42. The PCB assembly 30 further includes SPD connector clips 44 and SPD connector blades 46.

The trace pattern 60 includes six pads 61-66 and connecting traces 61A-66A connecting the pads 61-66 to respective SPD terminals 44. The trace pattern 60 also includes a ground terminal pad 68 and a common ground trace 68A electrically connecting certain of the SPD terminals 44 to the ground terminal pad 68. The through holes 67 may be plated through holes (PTH).

The ground terminal connector 48 (FIGS. 6 and 7) includes a pair of threaded posts 48A and a contact portion 48B electrically engaging the ground terminal pad 68. The ground terminal connector 48 is secured to the PCB 40 by a fastener 48C.

With reference to FIG. 3, each SPD module 50 includes a housing 52, an input terminal (a threaded socket) 54 and a ground terminal (a post) 56. The SPD modules 50 are paired in series with the input terminal 54 of the first SPD module electrically and mechanically coupled to an SPD connector blade 46 by a bolt 59, the ground terminal 56 of the second SPD module 50 electrically and mechanically coupled to a connector blade 46 by a nut 58, and the ground terminal port 56 of the first SPD module 50 and the input terminal 54 of the second SPD module 50 are each electrically and mechanically coupled to a third connector blade 46 captured therebetween. The connector blades 46 are each received in a respective one of the connector clips 44 to electrically connect the terminals of the SPD modules 50 to the trace pattern 60.

Figure 7:
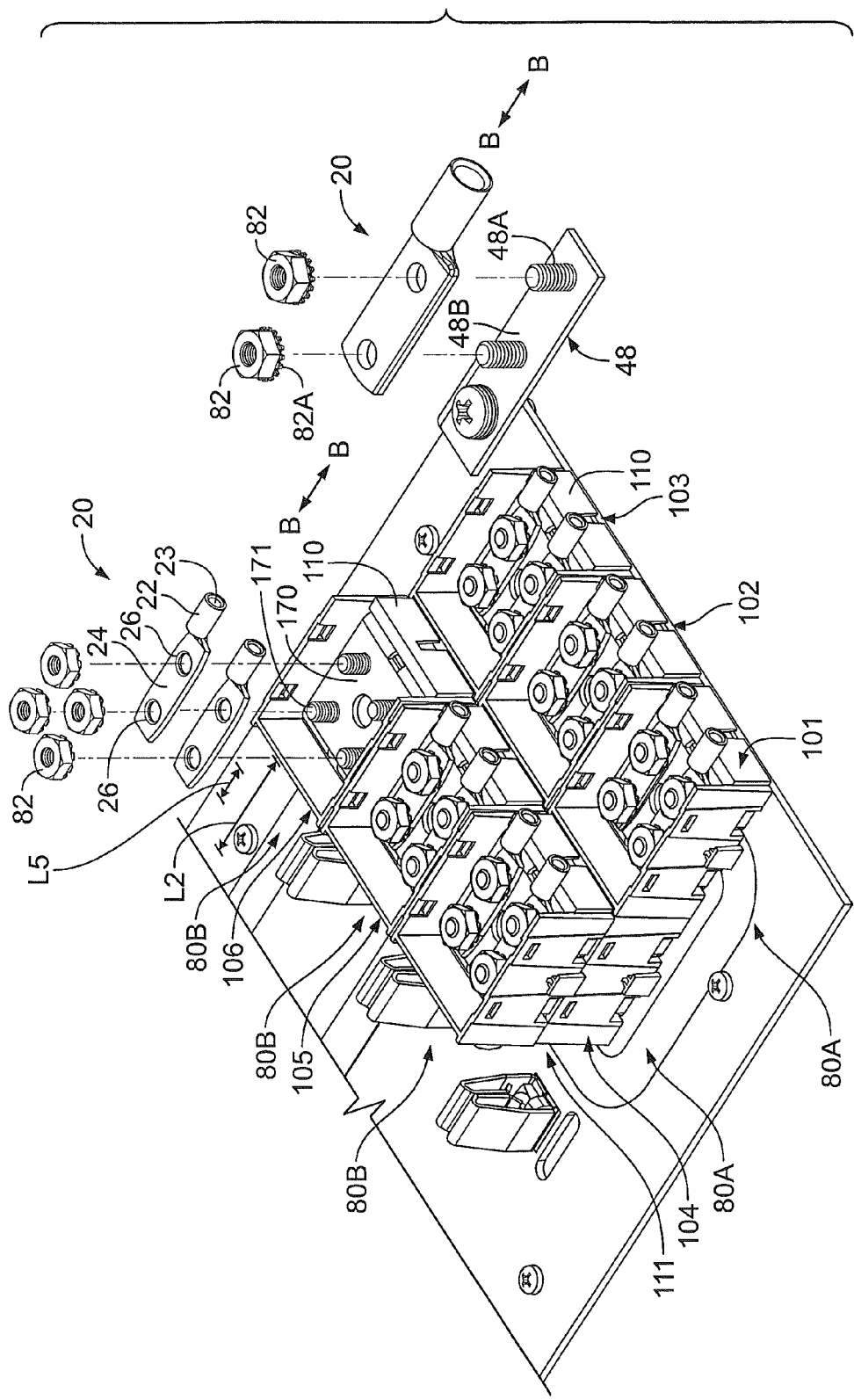
FIG. 7 is a fragmentary, exploded, top, front perspective view of the PCB assembly of FIG. 3 with cable lugs shown and the associated cables omitted for the purpose of explanation.
Figure 9:
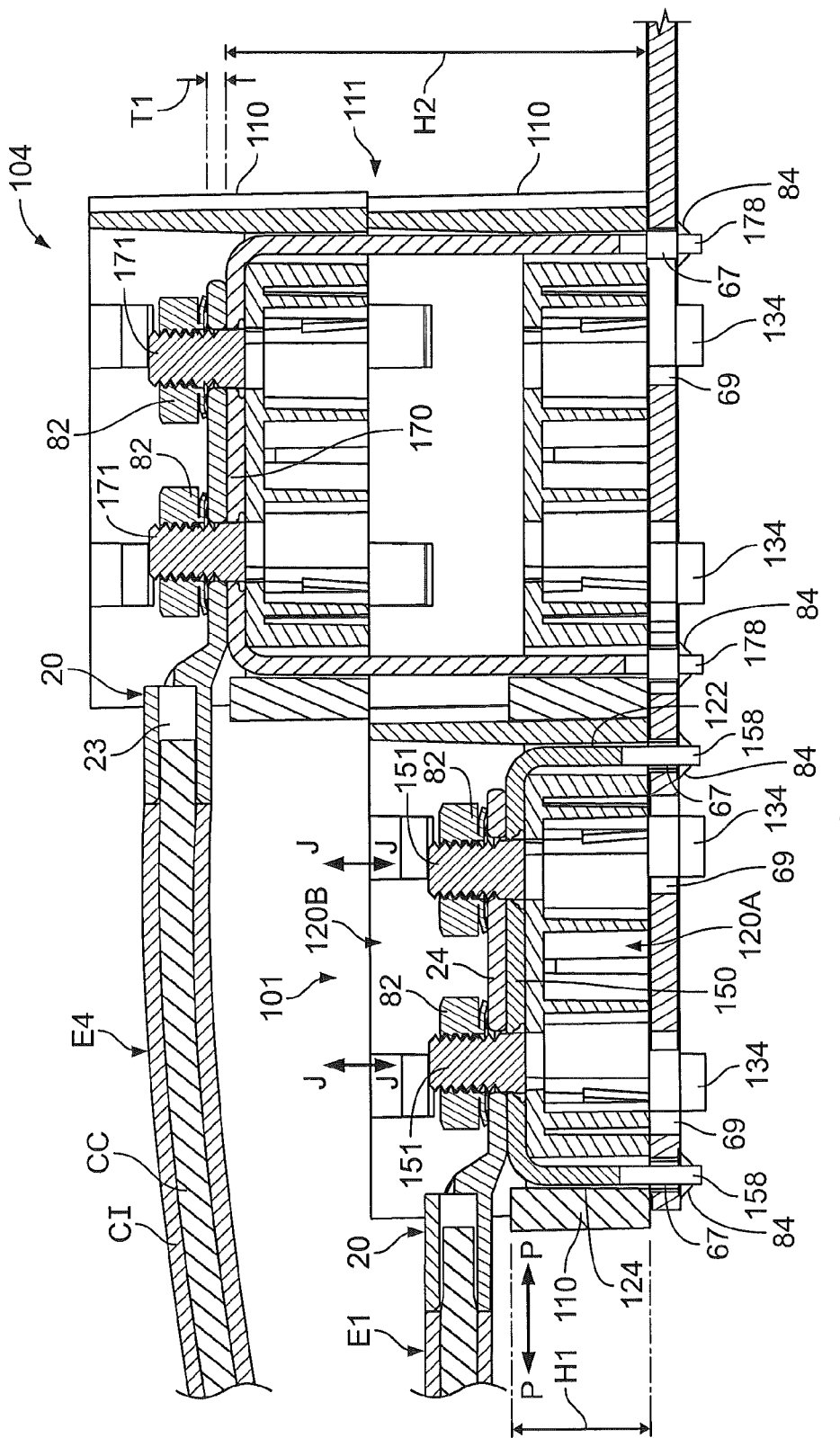
FIG. 9 is a cross-sectional view of the PCB assembly of FIG. 3 taken along the line 9-9 of FIG. 6.

With reference to FIGS. 7 and 9, each cable I1-I16, E1-E6, CG includes an electrical conductor CC (e.g., copper) surrounded by an electrical insulation layer or jacket CI, and is terminated by a respective cable lug 20. More particularly, a terminal portion of the cable conductor CC extends beyond the terminal end of the insulation CI and is received in a socket 23 defined in a coupling portion 22 of the cable lug 20.

The coupling portion 22 is compressed to securely clamp the lug 20 onto the cable conductor CC (i.e., the lug 20 is a compression lug). The lug 20 has a lengthwise axis B-B and an integral extension portion or blade 24 of the lug 20 extends forwardly from the coupling portion 22 along the axis B-B. Two lug holes 26 are defined in the blade 24. The lug holes 26 extend fully through the blade 24 and extend transversely (as shown, perpendicular) to the axis B-B. The lug holes 26 are aligned and spaced apart a prescribed distance along the axis B-B. Although not illustrated herein, the lug holes 26 may be offset from axis B-B in some embodiments.

According to some embodiments, the spacing distance L1 (FIG. 10) between the centers of the holes 26 is in the range of from about 5/8 inch to 1 3/4 inch. According to some embodiments, the distance L5 (edge to edge; FIG. 7) between the holes 26 is in the range of from about 3/8 inch to 1 1/4 inch.

According to some embodiments and as shown, the blade 24 is relatively plate-shaped or thin in thickness relative to its length and width. According to some embodiments, the length L2 (FIG. 7) of the blade 24 is at least 5 times its thickness T1 (FIG. 9). In some embodiments, the length and width of the lug may correspond to the size and/or cross-sectional area of the cable conductor CC.

The lugs 20 may be formed of any suitable material and, in some embodiments, are formed of a metal such as steel.

The terminal blocks 101-103 may be substantially identically constructed and the terminal blocks 104-106 may be substantially identically constructed. Therefore, the terminal blocks 101 and 104 will be described in more detail below, it being understood that these descriptions likewise apply to the remaining terminal blocks.

The terminal block 101 includes a base 110 and an electrical conductor member 150.

The base 110 may be formed of any suitable electrically insulating material. According to some embodiments, the base 110 is formed of a substantially rigid polymeric material such as polycarbonate/acrylonitrile butadiene styrene. In some embodiments, the base 110 is monolithic. In some embodiments, the base 110 is injection molded.

The conductor member 150 may be formed of any suitable electrically conductive material. According to some embodiments, the conductor member 150 is formed of a metal such as tin plated copper or tin plated aluminum. In some embodiments, the conductor member 150 is monolithic. In some embodiments, the conductor member 150 is stamped.

Turning to the base 110 in more detail and with reference to FIGS. 8-11, the base 110 includes a substantially planar platform 112 surrounded by a pair of opposed sidewalls 118, a rear wall 114, and an opposing front wall 116. The platform 112 and the walls 114, 116, 118 collectively define a lower cavity 120A (below the platform 112) and an upper cavity 120B (above the platform 112). A top opening 120C and a front opening 120D communicate with the upper cavity 120B.

An elongate front through slot 124 extends laterally between the front edge of the platform 112 and the front wall 116 and an elongate rear through slot 122 extends laterally between the rear edge of the platform 112 and the rear wall 114. Latch slots 126 (FIG. 11) are provided in the front and rear edges of the platform 112. Four spaced apart bolt holes 130 are defined in the platform 112 and communicate with respective underlying hexagonal sockets 130A. A central fastener hole 132 is also defined in the platform 112.

Four integral heightwise or vertical coupling features or tabs 134 extend from the lower edge of the side walls 118 and cooperating coupling features or slots 136 are defined in the side walls 118 proximate the upper edges thereof. According to some embodiments and as shown, the tabs 134 are barbed (with latch features 134A) configured to securely interlock with the slots 136 when inserted therein.

The base 110 also includes front and side coupling features or tabs 140 and cooperating rear and side coupling features or slots 142.

Figure 8:
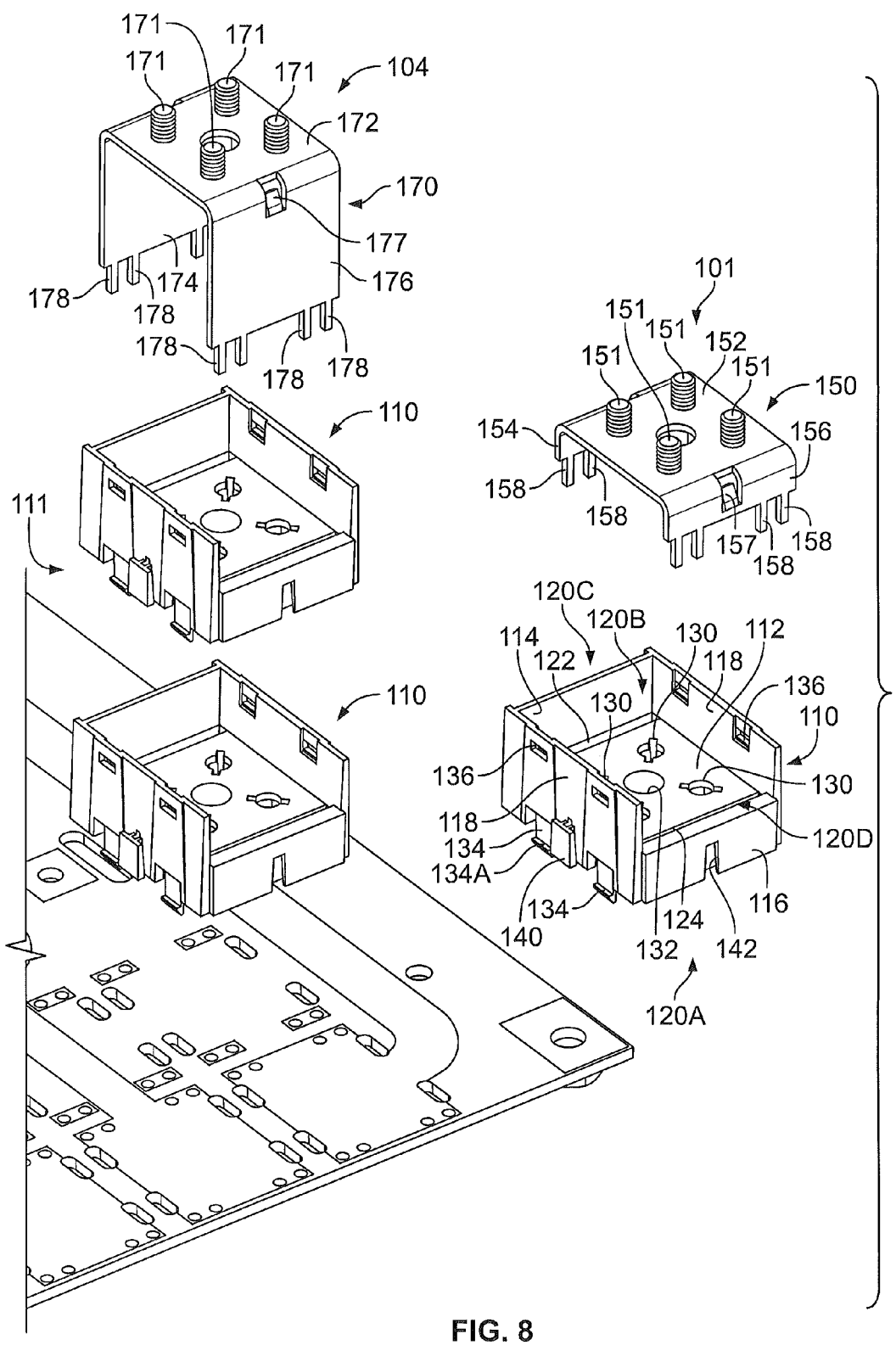
FIG. 8 is a fragmentary, exploded, top, front perspective view of the PCB assembly of FIG. 3.
Figure 11:
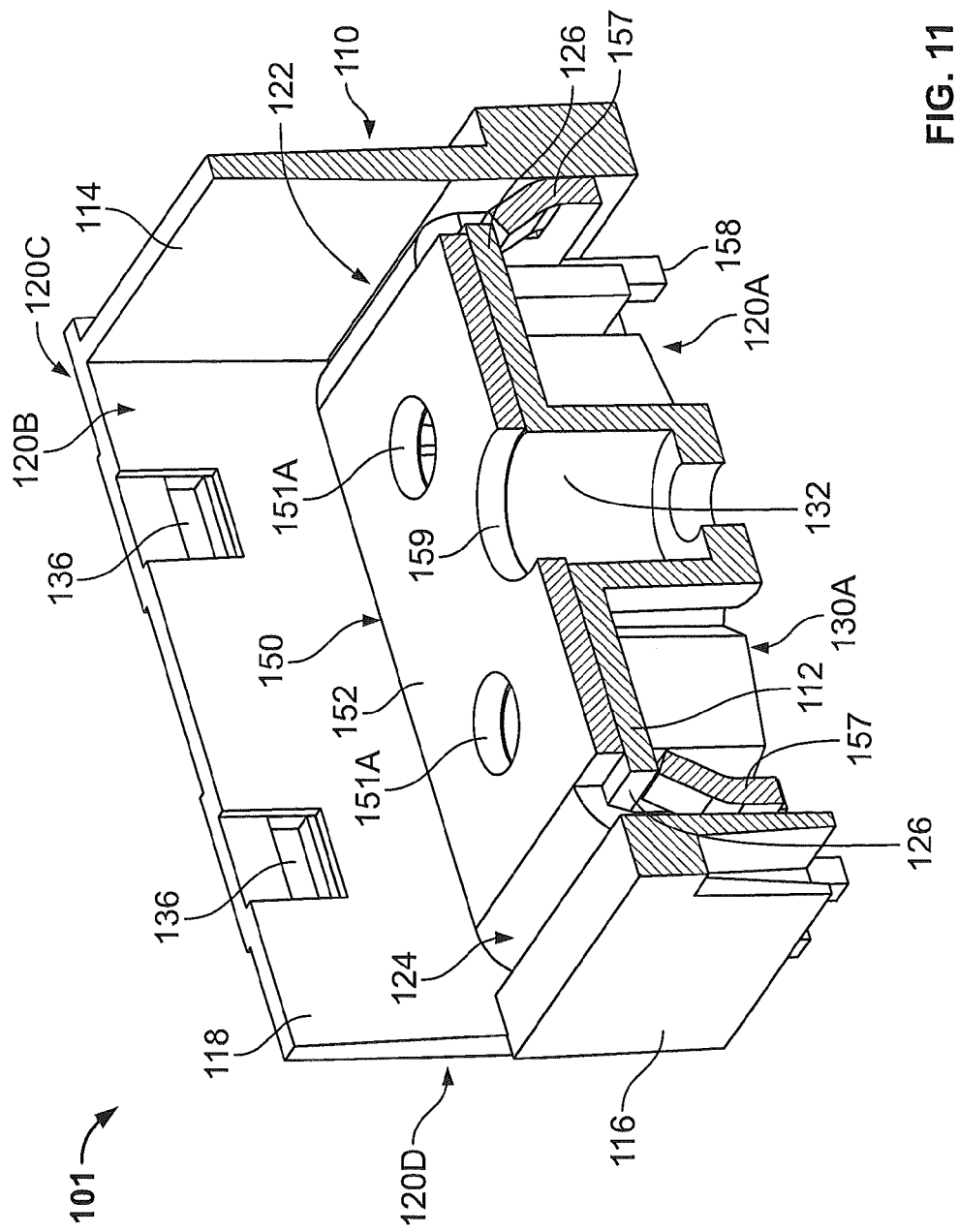
FIG. 11 is a fragmentary, cross-sectional view of the terminal block of FIG. 10.

Turning to the conductor member 150 in more detail and with reference to FIGS. 8 and 11, the conductor member 150 includes a body 152, an integral rear wall or flange 154 extending along and downwardly from the rear edge of the body 152, and an integral front wall or flange 156 extending along and downwardly from the front edge of the body 152. Integral electrical contact pins 158 extend downwardly from the lower edge of the flanges 154, 156. Latch tabs 157 extend inwardly from the flanges 154, 156. Four spaced apart post holes 151A and a central fastener hole 159 are defined in the body 152. Four elongate, threaded connector studs or posts 151 are affixed in the holes 151A and extend upwardly from the body 152.

When assembled, the conductor member 150 is mounted on the platform 112 such that the flanges 154 and 156 extend through the slots 122 and 124. The latch tabs 157 engage the edges of the platform 112 in the latch slots 126 to secure the conductor member 150 to the base 110. The contact pins 158 project downwardly below the lower edges of the walls 114, 116, 118. The connector posts 151 are located in the upper cavity 120B.

Figure 10:
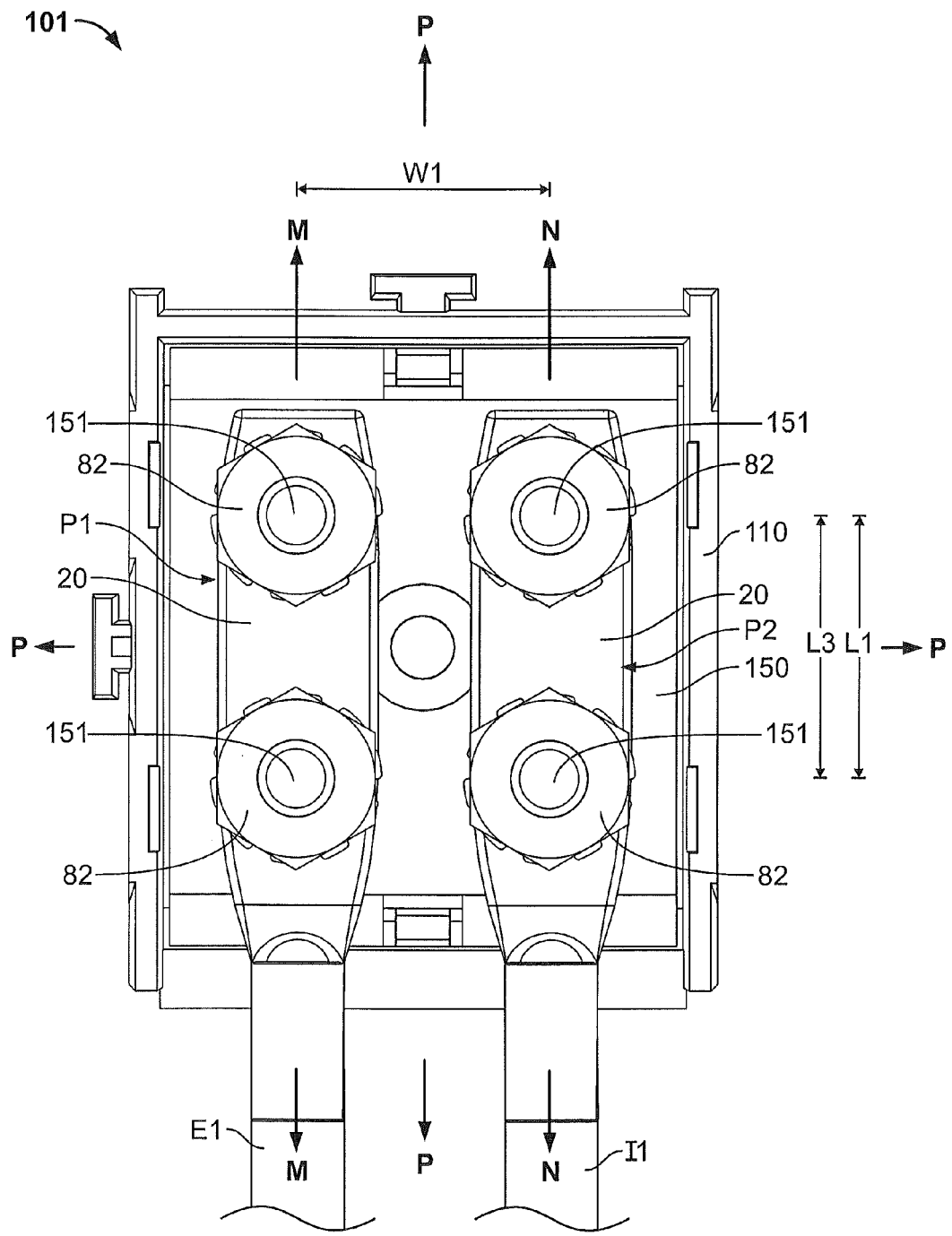
FIG. 10 is a top plan view of a terminal block forming a part of the PCB assembly of FIG. 3 with the cable lugs secured thereto.

The posts 151 each have a longitudinal post axis J-J (FIG. 9) extending transverse to and, in some embodiments and as shown, substantially orthogonal to the plane P-P of the body 152 (FIGS. 9 and 10) and the plane of the PCB 40. With reference to FIGS. 9 and 10, a first pair P1 of the posts 151 define a first connection axis M-M, and a second pair P2 of the posts 151 define a second connection axis N-N. According to some embodiments, the axes M-M and N-N are substantially parallel. The axes M-M and N-N are transverse to and, in some embodiments, substantially perpendicular to the post axes J-J. The centers of the posts 151 in each pair P1, P2 are spaced apart from one another a distance L3 that is substantially equal to the spacing distance L1 between the centers of the cable lug holes 26. The spacing distance W1 between the centers of the adjacent posts 151 of different pairs P1, P2 may be sufficient to permit two lug connectors 20 to be installed without overlapping or interfering with one another.

The terminal block 104 is constructed similarly to the terminal block 101 except that a second base 110 is employed and an electrical conductor member 170 is used in place of the conductor member 150. With reference to FIGS. 8 and 9, the two bases 110 are stacked to form a base assembly 111. More particularly, the coupling tabs 134 of the upper base 110 are interlocked with the coupling slots of the lower base 110 to form a substantially rigid base structure 111.

The conductor member 170 is configured in the same manner as the conductor member 150 except that the rear and front flanges 174, 176 are extended. When assembled, the flanges 174, 176 extend through the slots 122, 124 of both bases 110 so that the contact pins 178 project below the lower edge of the lower base 110, and the body 172 and the elongate, threaded connector posts 171 are disposed in the upper cavity of the upper base 110. The conductor member 170 is secured to the assembly 111 by the latch tab 177.

The terminal blocks 101-106 are installed on the PCB 40 by inserting their tabs 134 through the mount holes 69 and the contact pins 158 through the pin holes 67 of each respective pad 61-66 until the tabs 134 interlock (snapfit connection) to mechanically secure the terminal block 101-106 in place. The pins 158 may be soldered with solder 84 (FIG. 9) to ensure electrical continuity between the conductor member 150 and the respective pad 61-66. The terminal blocks 101-106 may be pre-assembled before placement on the PCB 40 or may be assembled on the PCB 40. The rear coupling tabs 140 of the terminal blocks 101-103 will interlock (dovetail connection) with the front coupling slots 142 of the adjacent terminal blocks 104-106 and the adjacent sideward coupling features 140, 142 will also interlock to join the terminal blocks 101-106 directly to one another in the terminal block array 80.

In the foregoing manner, the terminal blocks 101-106 (and, in particular, the conductor members 150, 170 thereof) are mechanically connected to the substrate 42 and electrically connected to the pads 61-66 and the traces 61A-66A, respectively, and thereby to the associated SPD module terminals 54, 56.

Figure 6:
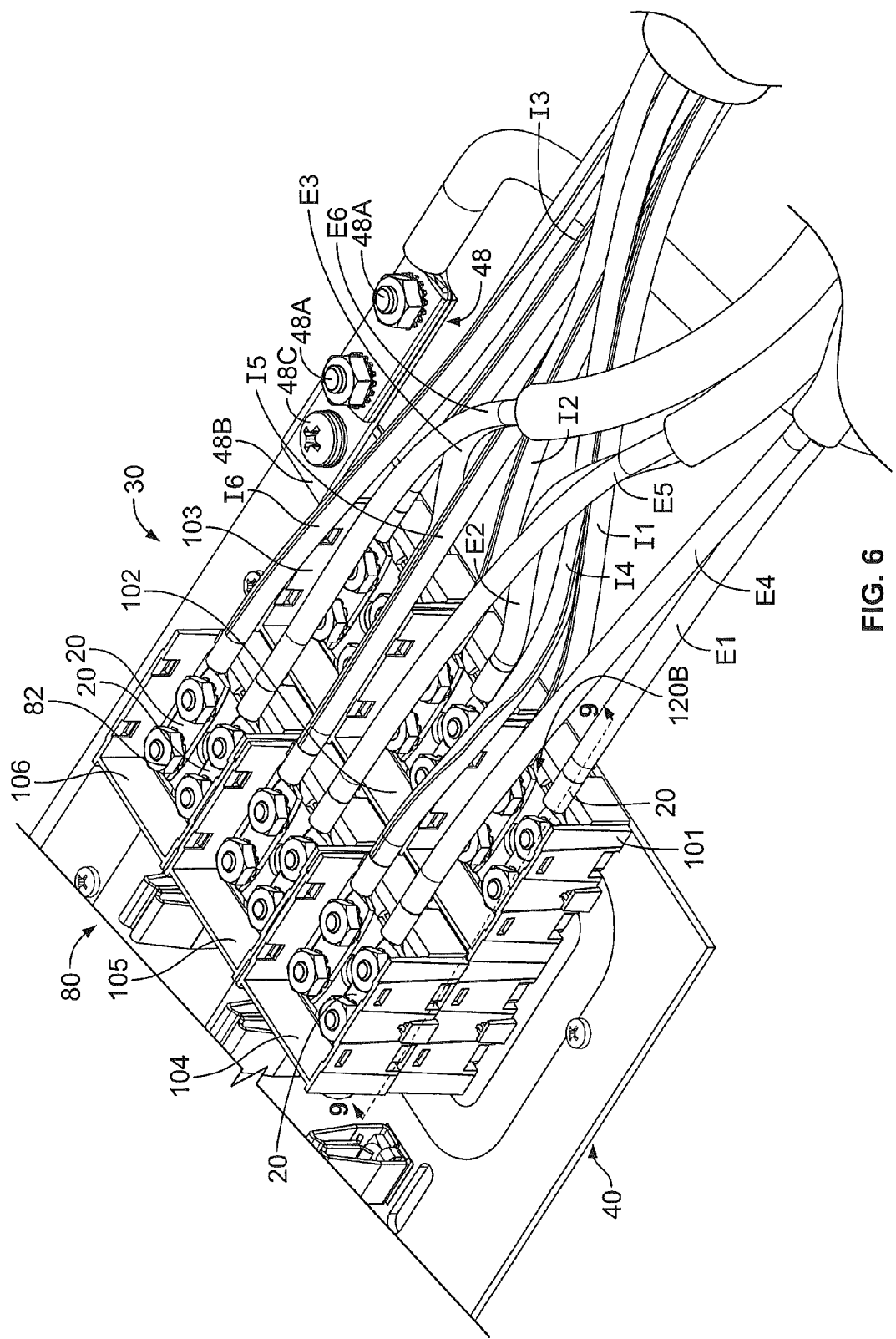
FIG. 6 is a fragmentary, top, front perspective view of the PCB assembly of FIG. 3 with cables connected thereto.

Notably, and as shown in FIGS. 6, 7 and 9, the cavities 120B of the terminal blocks 101-106 each face forwardly and are open from above. The bodies 152 of the front row 80A of the terminal blocks 101-103 are disposed at a first height H1 (FIG. 9) above the PCB 40 and the bodies of the second row 80A of the terminal blocks 104-106 are disposed at a second height 112 above the PCB 40, the second height H2 being greater than the first height H1. According to some embodiments, the second height H2 is between about ½ inch and 2 inches greater than the first height H1. This tiered or multi-level connector terminal configuration can provide increased connection density and enable a smaller overall form factor, while also providing convenient and effective access for an installer making the cable connections.

According to some embodiments and as shown in FIG. 6, the cables are connected to the PCB assembly 30 as follows to form a desired electrical circuit arrangement. The input cable I1 and the output cable E1 are connected to the terminal block 101, the cables I2 and E2 are connected to the terminal block 102, the cables I3 and E3 are connected to the terminal block 103, the cables I4 and E4 are connected to the terminal block 104, the cables I5 and E5 are connected to the terminal block 105, the cables I6 and E6 are connected to the terminal block 106.

More particularly, the lug 20 of each cable is placed over a corresponding pair of front and rear threaded posts 161 or 171 (which are received through the lug holes 26) and clamped onto the body 152 or 172 by nuts 82. In some embodiments, lock washers are also provided between the nuts 82 and the lugs 20. In some embodiments, the nuts 82 include integral lock washers 82A (FIG. 7). In this manner, the lug 20 is pressed and secured in firm electrical contact with the body 152, 172. The lug 20 is also securely mechanically affixed to the conductor member 150, 170.

Figure 18:
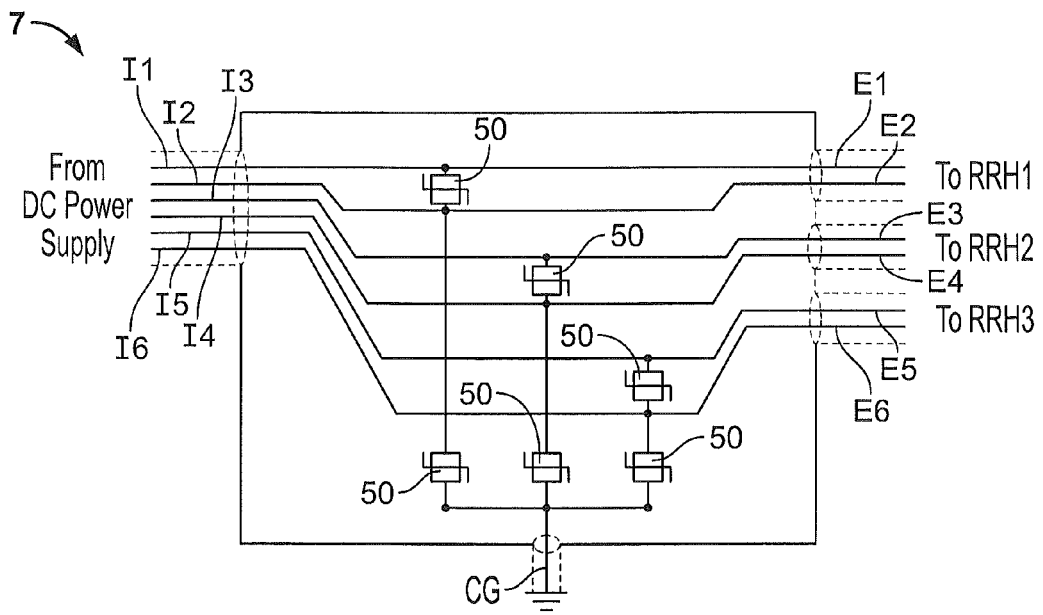
FIG. 18 is a schematic electrical diagram representing an electrical circuit including the surge protection system of FIG. 1.

The pairs of input and output cables are thus each electrically connected to a common (i.e., the same) conductor member 150 or 170 and electrically insulated or isolated from the other cables by the bases 110. Thus, as can be seen in the schematic circuit diagram of FIG. 18, the terminal blocks 101-106 can each provide a Kelvin connection for a pair of cables (an input cable and an output cable) each terminated by a two hole lug 20. The two lugs 20 are thereby electrically inline terminated (i.e., electrically common) at the conductor member 150 or 170. Because the conductor members 150, 170 are directly electrically connected to the trace pattern 60 of the PCB 40, each terminal block 101-106 effectively provides a Kelvin connection between the input and output cables and the SPD module terminal associated with the terminal block. Each Kelvin connection acts as a junction and receives power from a power source through the cables I1-I6 (and their lugs 20) and distributes power to a load through the cables E1-E6 (and their lugs 20) while providing a connection to the SPD module 50 on the PCB 40. Thus, the two conductors are part of the same circuit and the associated SPD module 50 is electrically connected with the ground and each of the input wire and the output wire.

In addition to electrically isolating the conductor members 150, 170 from one another, the bases 110 provide an air gap between the two lines of the DC power circuit to prevent arcing.

The direct electrical couplings between the contact pins 158, 178 and the trace pads 61-66, and in particular the soldered connections therebetween, can reduce ohmic resistance between the terminal blocks 101-106 and the trace pattern 60 for better electrical connection to the PCB 40. The contact pins 158, 178 can be soldered to the PCB 40 using conventional soldering techniques rather than requiring mechanical assembly.

The features of the bases 110 aid in assembly and versatility. The bases 110 can be combined in any number to construct a terminal block array having a desired number of columns. The terminal blocks 101-106 provide the ability to selectively combine individual terminal blocks in both the horizontal and vertical directions allowing multiple rows of terminal blocks to be assembled and accessed. The interconnection features 134, 136, 140, 142 can be used to securely mechanically interconnect the terminal blocks to one another and to the PCB.

Figure 2:
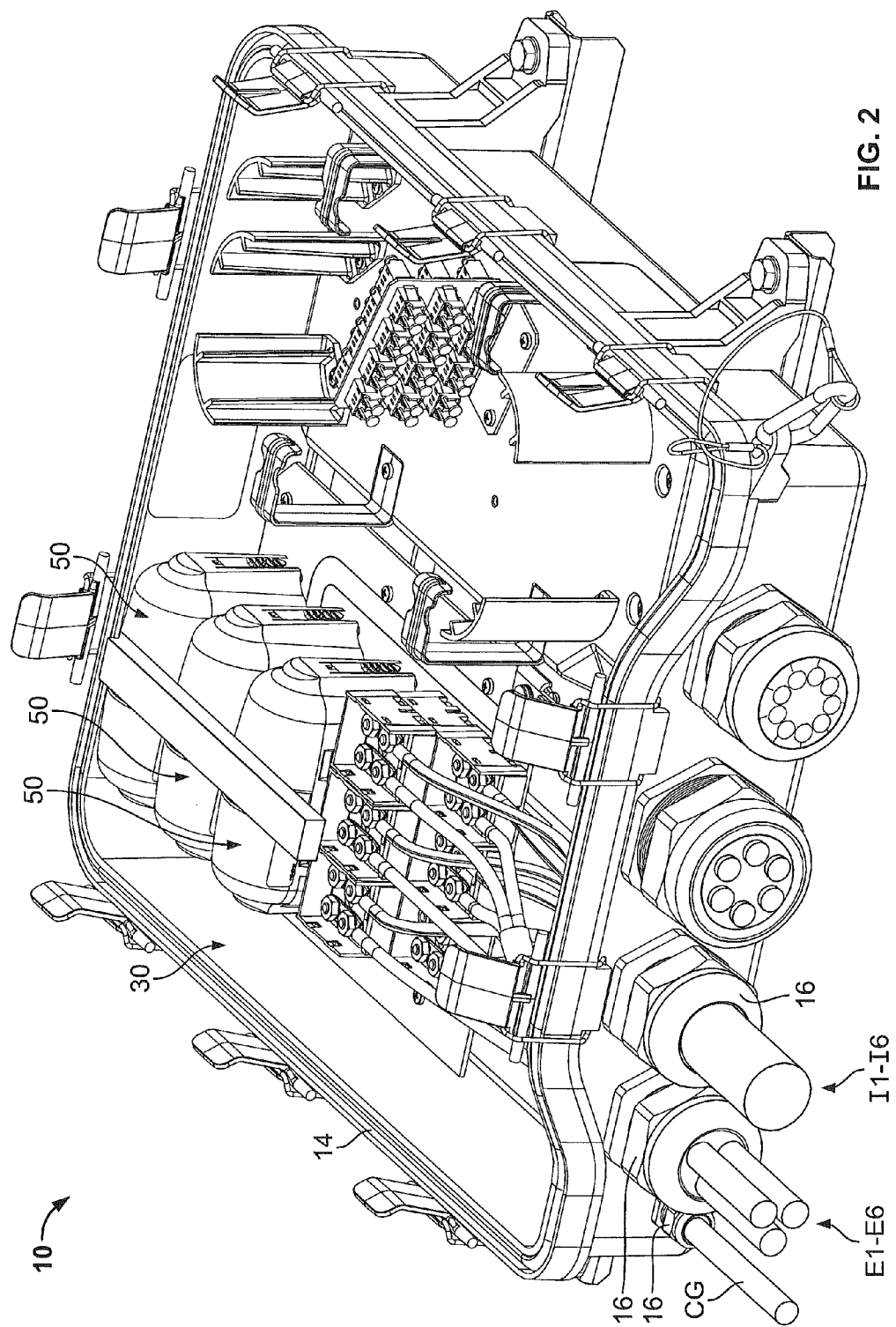
FIG. 2 is a top, front perspective view of the surge protection system of FIG. 1 with a lid thereof removed.
Figure 12:
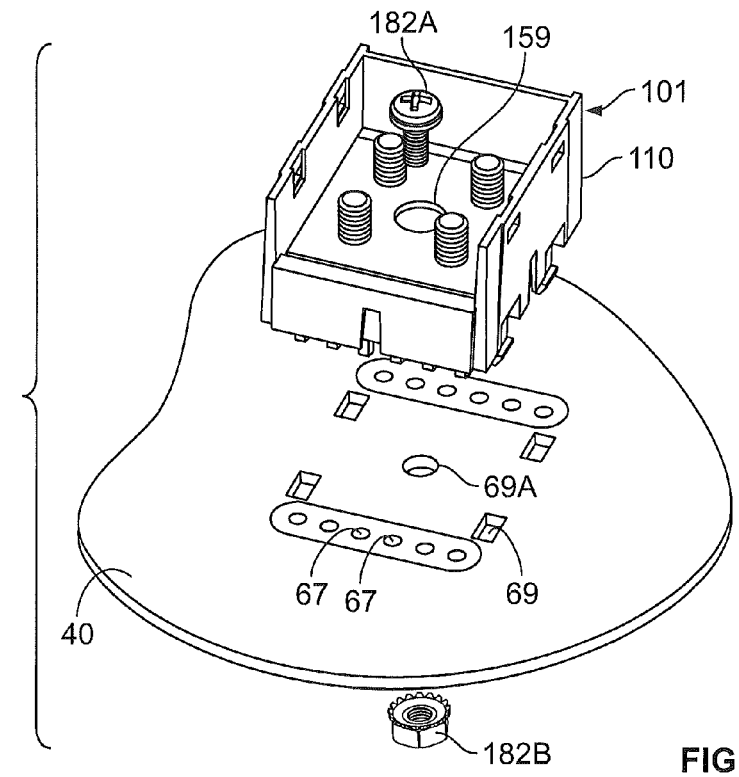
FIG. 12 is an exploded, perspective view of the terminal block of FIG. 10 mounted on a PCB in an alternative arrangement.
Figure 13:
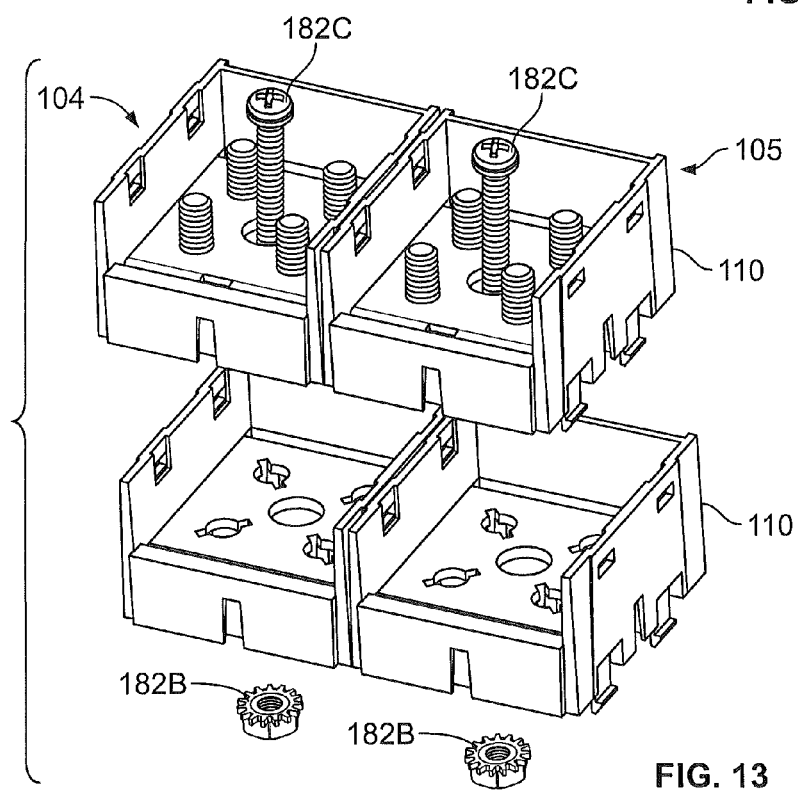
FIG. 13 is an exploded, perspective view of a further terminal block according to embodiments of the present invention.
Figure 14:
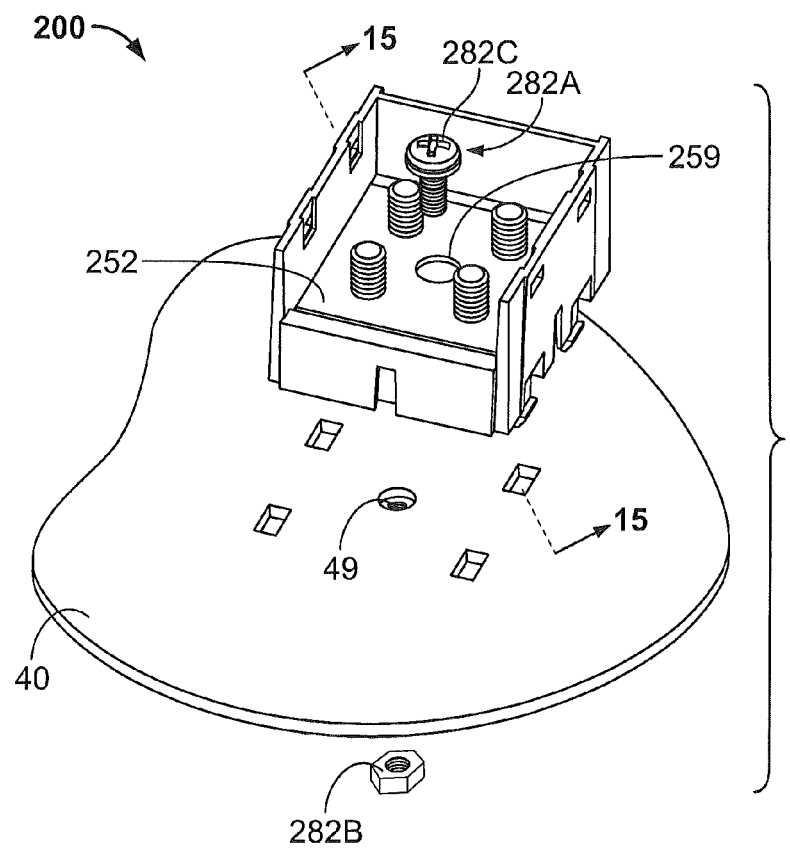
FIG. 14 is an exploded, perspective view of a further terminal block according to embodiments of the present invention.
Figure 15:
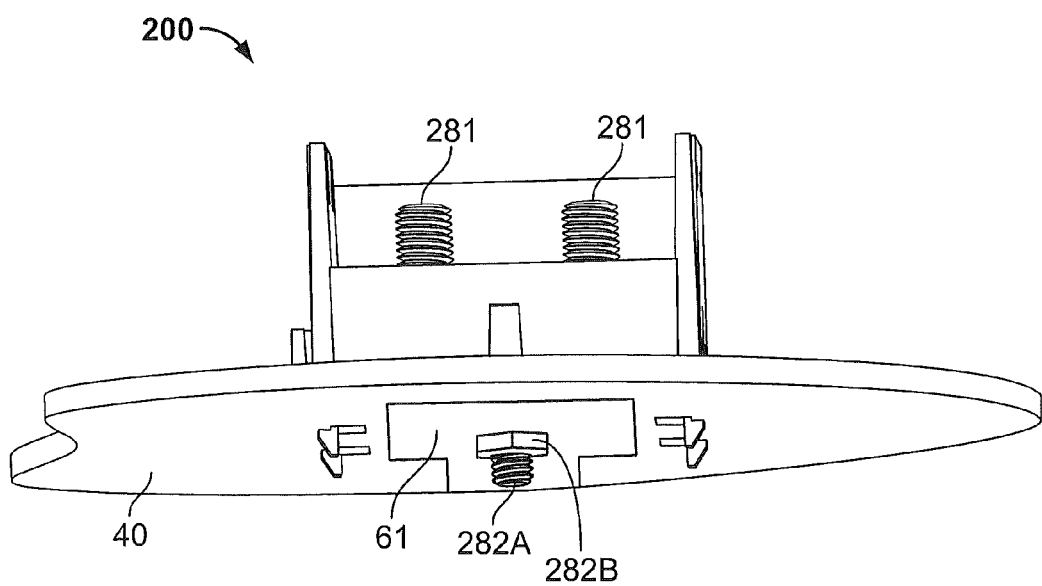
FIG. 15 is a bottom perspective view of the terminal block of FIG. 14.

The connections of the tabs 134 with the PCB mount holes 69 may provide adequate strain relief in some applications. In some applications, supplemental cable strain relief may be provided (e.g., strain relief mechanisms 16 as shown in FIG. 2). In some applications and embodiments, supplemental mounting fasteners may be used to directly secure the terminal blocks 101-106 to the PCB 40 for strain relief. For example, as shown in FIG. 12, a fastener or bolt 182A is inserted through the holes 132, 159 and a PCB mount hole 69A and secured by a nut 182B to anchor a terminal block 101 to the PCB 40. In FIG. 13, a similar coupling arrangement is shown for anchoring the tall terminal blocks 104, 105 to the PCB 40 using a relatively longer bolt 182C for each that extends through the hole 179 and the holes 132 in both bases 110.

The threaded posts or inserts 151, 171 may be press-fit or welded into the post holes 151A. In some embodiments, the threaded inserts or posts 151 or 171 are replaced with coupling bolts corresponding to the coupling bolts 280 (discussed hereinbelow) that are installed to project upwardly into the cavity 120B. The threaded shafts of these bolts are likewise configured and used, in cooperation with nuts 82, to secure the lugs 20 in the same manner as the posts 151, 171. The bolts may be secured in the hex-shaped sockets 130A and axially retained therein by integral clip features (e.g., as described hereinbelow regarding the bolts 280).

The SPD modules 50 may be any suitable surge protection devices. In some embodiments, the SPD modules 50 are metal-oxide varistor (MOV)-based surge protection modules. In some embodiments, the SPD modules 50 are SPD modules as disclosed in U.S. Pat. No. 6,430,020 and/or U.S. Pat. No. 7,433,169, the disclosures of which are incorporated herein by reference. Suitable SPD modules include STRIKE-SORB™ surge protection devices available from Raycap Corporation of Germany.

With reference to FIGS. 14-17, an electrical terminal block 200 according to further embodiments is shown therein. The terminal block 200 can be configured and used in the same manner as the terminal block 100 except as follows. The terminal block 200 includes a base 110 and an electrical conductor member 250 corresponding to the conductor member 150 except that the contact pins 158 are not provided, the fastener hole 259 is reduced in diameter, and coupling bolts 280 are provided in place of the inserts 151.

Figure 17:
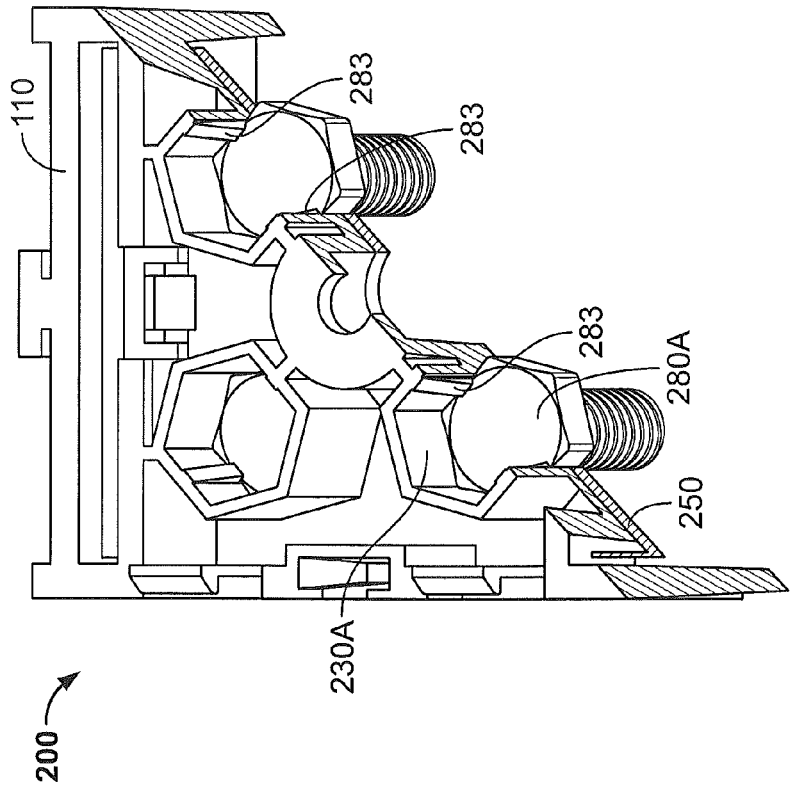
FIG. 17 is a cross-sectional, perspective view of the terminal block of FIG. 14.
Figure 16:
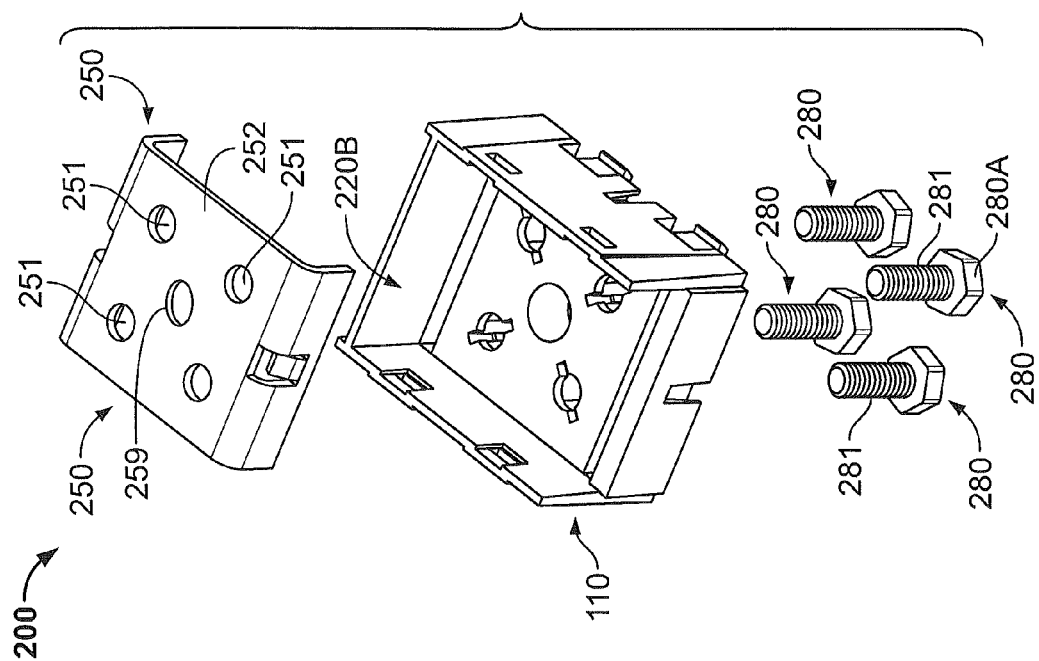
FIG. 16 is a further exploded view of the terminal block of FIG. 14.

With reference to FIGS. 16 and 17, the coupling bolts 280 are installed to project upwardly through the post holes 251 into the cavity 220B. The threaded shafts 281 of the bolts 280 are likewise configured and used, in cooperation with nuts 82, to secure the lugs 20 in the same manner as the posts 151. The bolts 280 may provide enhanced strength. The hex-shaped heads 280A of the bolts 280 may be inserted into the hex-shaped sockets 230A and axially retained therein by integral clip features 283. The geometry of the sockets 230A prevents the bolts 280 from rotating when the nuts 82 are tightened onto the bolts 280.

In use, the terminal block 200 is assembled and installed on the PCB 40 using the coupling tabs 134 as discussed above with regard to the terminal block 100. A fastener or bolt 282A is inserted through the fastener hole 259 and a through hole 49 in the PCB 40. The bolt 282A is secured by a nut 282B on the opposing side of the PCB 40. The head 282C of the bolt 282A engages the body 252 of the conductor member 250 to thereby provide an electrical connection between the conductor member 250 through the bolt 282A and the nut 282B to a contact pad 61 of the trace 60.

Figure 19:
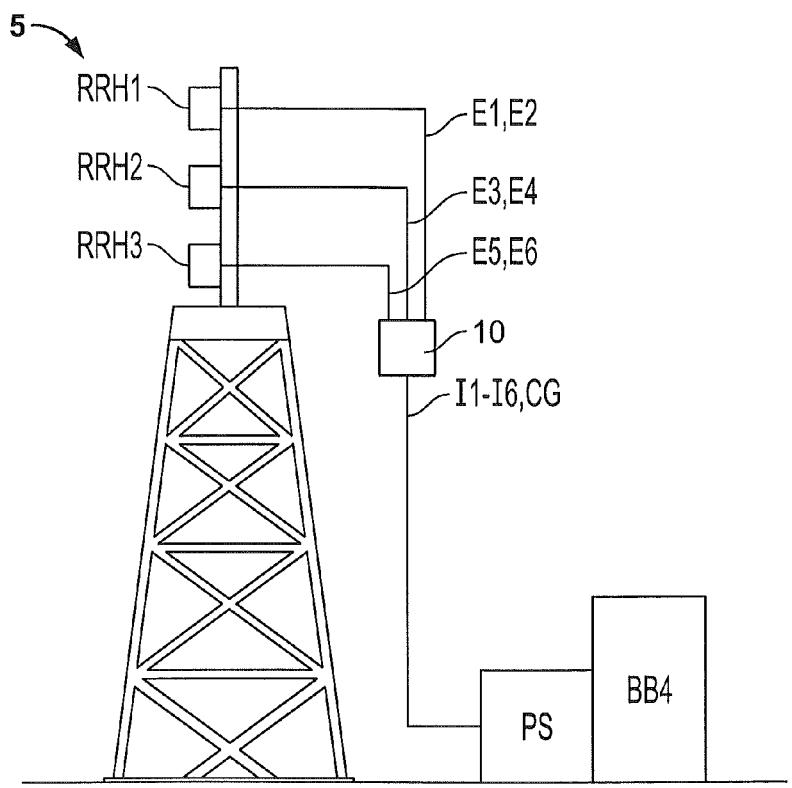
FIG. 19 is a schematic diagram illustrating a radio base station installation including the surge protection system of FIG. 1.

With reference to FIG. 19, a radio base station (RBS) installation 5 illustrating (not to scale) an implementation of the SPD system 10 according to some embodiments of some embodiments is schematically shown therein. In the illustrated RBS architecture, three remote radio heads (RRH) RRH1, RRH2 and RRH3 are connected to a base band unit BBU and mounted on a raised structure T (e.g., a tower or rooftop). DC power is provided from a power supply PS to the remote radio heads RRH1, RRH2, RRH3 through the copper cabling I1-I6, E1-E6 and CG. The cables I1-I6 are electrically inline terminated and connected by the SPD 10 as discussed above and shown in FIGS. 1-6 and 18 to form an electrical circuit 7 as represented in FIG. 18.

According to further embodiments, a terminal block as disclosed herein can be used to electrically and mechanically connect two dual hole cable lugs (e.g., lugs 20) and their associated cables and to mechanically couple the cable lugs to a supporting substrate without using the terminal block to electrically connect the cable lugs to the substrate. In this case, the substrate may be a PCB or a non-PCB backplate, box, enclosure or cabinet wall, or other suitable wall or panel. For example, referring to FIG. 15, the PCB 40 may be instead a backplate not having a trace pad 61 so that the mounting bolt 282B does not electrically connect the electrical conductor member 250 to the backplate, but still electrically connects two cables (each having a two hole lug 20) secured to the posts 281.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A printed circuit board (PCB) assembly for use with first and second cables terminated with first and second cable lugs, respectively, wherein each of the first and second cable lugs includes two lug holes defined therein, the PCB assembly comprising:
 a PCB; and
 a terminal block including:
  an electrically insulating base mounted on the PCB; and
  at least one electrically conductive conductor member mounted on the base and electrically connected to the PCB;
  wherein the at least one conductor member is configured to engage each of the first and second cable lugs through the four lug holes thereof to electrically in-line terminate the first and second cables at the terminal block;
 wherein:
  the at least one conductor member includes an electrically conductive conductor member body and four connecting posts projecting from the conductor member body; and
  the four connector posts are arranged and configured to extend through the four lug holes of the first and second cable lugs to secure the first and second cable lugs to the conductor member body.

2. The PCB assembly of claim 1 wherein the at least one conductor member is an integral conductor member configured to directly electrically contact each of the first and second cable lugs through the four lug holes thereof to electrically in-line terminate the first and second cables at the terminal block.

3. The PCB assembly of claim 1 wherein:
 the connector posts are each threaded posts; and
 the PCB assembly further includes four nuts installable on the threaded posts to clamp the first and second cable lugs onto the conductor member body.

4. The PCB assembly of claim 3 wherein:
 the four posts each form a part of a respective bolt extending through the base and the conductor member body; and
 the base includes anti-rotation features to restrain the rotation of the bolts when the nuts are installed on the bolts.

5. The PCB assembly of claim 1 wherein:
 the base defines an upper cavity on a side of the at least one conductor member opposite the PCB; and
 the terminal block is configured to receive and secure the first and second cable lugs in the upper cavity.

6. The PCB assembly of claim 1 wherein:
 the base defines a lower cavity between the at least one conductor member and the PCB; and
 the terminal block is configured to receive and secure the first and second cable lugs on a side of the conductor member opposite the lower cavity.

7. The PCB assembly of claim 1 wherein the terminal block includes at least one integral electrical contact pin extending into the PCB and electrically connecting the at least one conductor member to an electrically conductive trace pattern of the PCB.

8. The PCB assembly of claim 1 including a bolt securing the terminal block to the PCB.

9. The PCB assembly of claim 8 wherein the bolt electrically connects the at least one conductor member to an electrically conductive trace pattern of the PCB.

10. The PCB assembly of claim 1 wherein at least one of the at least one conductor member and the base includes an integral coupling feature interlocking the at least one conductor member and the base together.

11. The PCB assembly of claim 1 wherein the base includes a coupling feature that is received in the PCB to secure the terminal block to the PCB.

12. The PCB assembly of claim 1 including a second electrically insulating base mounted on the PCB, wherein the first base is mounted on top of and is secured to the PCB by the second base.

13. The PCB assembly of claim 1 including a plurality of the terminal blocks mounted on the PCB to form a terminal block array.

14. The PCB assembly of claim 13 wherein at least one of the terminal blocks of the terminal block array includes an integral coupling feature securing said terminal block to an adjacent terminal block of the terminal block array.

15. The PCB assembly of claim 13 including:
 a first one of the terminal blocks of the terminal block array configured to secure a first pair of the cable lugs at a first height above the PCB; and
 a second one of the terminal blocks of the terminal block array configured to secure a second pair of the cable lugs at a second height above the PCB, wherein the second height is greater than the first height to provide a multi-level connection configuration.

16. The PCB assembly of claim 1 including a surge protection device (SPD) module mounted on the PCB, wherein the PCB includes an electrically conductive trace electrically connecting the terminal block to a terminal of the SPD module.

17. A method for connecting first and second cables to a printed circuit board (PCB) assembly, wherein the first and second cables are terminated with first and second cable lugs, respectively, and each of the first and second cable lugs includes two lug holes defined therein, the method comprising:
 providing a PCB assembly including:
  a PCB; and
  a terminal block including:
   an electrically insulating base mounted on the PCB; and
   at least one electrically conductive conductor member mounted on the base and electrically connected to the PCB, the at least one conductor member including an electrically conductive conductor member body and four connecting posts projecting from the conductor member body; and
 engaging each of the first and second cable lugs with the at least one conductor member through the four lug holes thereof to electrically in-line terminate the first and second cables at the terminal block;
 wherein the four connector posts are arranged and configured to extend through the four lug holes of the first and second cable lugs to secure the first and second cable lugs to the conductor member body.

18. The method of claim 17 wherein:
 the method includes electrically connecting a device to the conductor member via the PCB;
 the first cable is an electrical input cable connected to a power source;
 the second cable is an electrical output cable connected to a load; and
 the terminal block forms a junction that receives power from the power source via the first cable, distributes the power to the load via the second cable, and electrically connects the first and second cables to the device.

19. A printed circuit board (PCB) assembly for use with first and second cables terminated with first and second cable lugs, respectively, wherein each of the first and second cable lugs includes two lug holes defined therein, the PCB assembly comprising:
   a PCB; and
   a terminal block including:
      an electrically insulating base mounted on the PCB; and
      at least one electrically conductive conductor member mounted on the base and electrically connected to the PCB;
      wherein the at least one conductor member is configured to engage each of the first and second cable lugs through the four lug holes thereof to electrically in-line terminate the first and second cables at the terminal block; and
      wherein the terminal block includes at least one integral electrical contact pin extending into the PCB and electrically connecting the at least one conductor member to an electrically conductive trace pattern of the PCB.

20. The PCB assembly of claim 19 wherein the at least one contact pin is soldered to the PCB.

21. The PCB assembly of claim 19 including a bolt securing the terminal block to the PCB.

22. The PCB assembly of claim 21 wherein the bolt electrically connects the at least one conductor member to an electrically conductive trace pattern of the PCB.

\* \* \* \* \*

UNITED STATES PATENT AND TRADEMARK OFFICE
CERTIFICATE OF CORRECTION

| | | |
|---|---|---|
| PATENT NO. | : 9,166,312 B2 | Page 1 of 1 |
| APPLICATION NO. | : 14/220982 | |
| DATED | : October 20, 2015 | |
| INVENTOR(S) | : Bakatsias et al. | |

It is certified that error appears in the above-identified patent and that said Letters Patent is hereby corrected as shown below:

<u>In the specification,</u>
Column 8, Line 22: Please correct "height 112"
to read -- height H2 --

Signed and Sealed this
Fifth Day of April, 2016

Michelle K. Lee
*Director of the United States Patent and Trademark Office*